(12) United States Patent
Hwang et al.

(10) Patent No.: US 12,145,194 B2
(45) Date of Patent: Nov. 19, 2024

(54) CASTING PRODUCTS FOR COOLING HEATING ELEMENTS AND METHOD OF MANUFACTURING THE SAME

(71) Applicants: NEDEC Co., Ltd., Gimcheon-si (KR); Kwang Hoon Park, Busan (KR)

(72) Inventors: Se Joon Hwang, Seongnam-si (KR); Han Goo Kim, Seongnam-si (KR); Seong Woo Kim, Suwon-si (KR); Kwang Hoon Park, Busan (KR)

(73) Assignees: NEDEC Co., Ltd., Gimcheon-si (KR); Kwang Hoon Park, Busan (KR)

( * ) Notice: Subject to any disclaimer, the term of this patent is extended or adjusted under 35 U.S.C. 154(b) by 0 days.

(21) Appl. No.: 18/511,956

(22) Filed: Nov. 16, 2023

(65) Prior Publication Data

US 2024/0173768 A1 May 30, 2024

(30) Foreign Application Priority Data

Nov. 25, 2022 (KR) .................. 10-2022-0159913

(51) Int. Cl.
*B22D 19/00* (2006.01)
*B22D 17/00* (2006.01)
*H01M 50/249* (2021.01)

(52) U.S. Cl.
CPC ....... *B22D 19/0009* (2013.01); *B22D 17/005* (2013.01); *H01M 50/249* (2021.01)

(58) Field of Classification Search
CPC ......... F28F 1/08; B22D 17/00; B22D 17/005; B22D 19/00; B22D 19/0009

USPC .................................. 165/179; 164/98, 412
See application file for complete search history.

(56) References Cited

U.S. PATENT DOCUMENTS

| | | | | |
|---|---|---|---|---|
| 6,026,890 A | * | 2/2000 | Akachi | F28D 15/0275 165/177 |
| 2003/0192674 A1 | * | 10/2003 | Ippoushi et al. | F28D 15/06 165/104.21 |
| 2004/0177948 A1 | * | 9/2004 | Cho et al. | F28D 1/0477 165/150 |
| 2009/0301696 A1 | * | 12/2009 | Iwasaki | F28D 1/0435 165/140 |

FOREIGN PATENT DOCUMENTS

| | | |
|---|---|---|
| KR | 10-2015-0041187 A | 4/2015 |
| KR | 10-1674068 B1 | 11/2016 |

* cited by examiner

*Primary Examiner* — Kevin P Kerns
(74) *Attorney, Agent, or Firm* — Revolution IP, PLLC

(57) ABSTRACT

Provided are casting products for cooling heating elements, the casting products including: a body made of a metal material; and a cooling pipe providing a path through which a cooling fluid flows, and being made of an aluminum alloy material, wherein the body includes a plate-shaped plate portion, protrusion extensions protruding from the plate portion and extending along the cooling pipe so that at least part of the cooling pipe is fully buried, and a cooling pin structure formed integrally with the plate portion, and the cooling pipe is formed in such a way that a first pipe thickness of the cooling pipe having a cross-sectional shape in a first direction is greater than a second pipe thickness in a second direction perpendicular to the first direction, and the first direction is in parallel to the plate portion, and the second direction is a thickness direction of the plate portion.

8 Claims, 11 Drawing Sheets

CASTING PRODUCTS FOR COOLING HEATING ELEMENTS AND METHOD OF MANUFACTURING THE SAME

CROSS-REFERENCE TO RELATED APPLICATION

This application claims the benefit of Korean Patent Application No. 10-2022-0159913, filed on Nov. 25, 2022, in the Korean Intellectual Property Office, the disclosure of which is incorporated herein in its entirety by reference.

TECHNICAL FIELD

The present invention relates to technology for cooling heating elements, and more particularly, to casting products for cooling heating elements.

BACKGROUND ART

With regard to casting products for cooling heating elements and a method of manufacturing the same that is a technical field of the present invention, a method of manufacturing a cooling module is disclosed in Korean Patent Registration No. 10-1674068. The method of manufacturing the cooling module disclosed in Korean Patent Registration No. 10-1674068 includes preparing a mold, manufacturing a cooling pipe, fixing the cooling pipe into the mold, and injecting a molten metal into a cavity. However, in the method according to the related art, since the molten metal flows in the cavity and pressurizes the cooling pipe at a high pressure, the shape of the cooling pipe may be deformed in a manufacturing process. In particular, although an aluminum alloy has high thermal conductivity and can provide excellent cooling performance, it has low strength. Thus, it is very difficult to manufacture the aluminum alloy using an insert injection molding method.

DISCLOSURE OF THE INVENTION

The present invention provides casting products for cooling heating elements having enhanced cooling efficiency and a method of manufacturing the same.

The present invention also provides a method of manufacturing casting products for cooling, whereby, when casting products for cooling are manufactured through an insert injection molding method using a cooling pipe, the deformation and out of position of the cooling pipe can be prevented.

According to an aspect of the present invention, there is provided casting products for cooling heating elements, the casting products including: a body made of a metal material; and a cooling pipe providing a path through which a cooling fluid flows, and being made of an aluminum alloy material, wherein the body includes a plate-shaped plate portion, protrusion extensions protruding from the plate portion and extending along the cooling pipe so that at least part of the cooling pipe is fully buried, and a cooling pin structure formed integrally with the plate portion, and the cooling pipe is formed in such a way that a first pipe thickness of the cooling pipe having a cross-sectional shape in a first direction is greater than a second pipe thickness in a second direction perpendicular to the first direction, and the first direction is in parallel to the plate portion, and the second direction is a thickness direction of the plate portion.

According to another aspect of the present invention, there is provided a method of manufacturing casting products for cooling heating elements, the method including: preparing a mold in which a first mold and a second mold to be combined with each other and to form a cavity are prepared; installing a pipe in which a cooling pipe formed of an aluminum alloy material is installed in a space corresponding to the cavity before the first mold and the second mold are combined with each other; combining a mold in which the first mold and the second mold are combined with each other to form the cavity and the cooling pipe is disposed in the cavity; and injecting a molten metal in which the molten metal is injected into the cavity so that the molten metal moves in a flow direction from the cavity, and wherein the cooling pipe is formed in such a way that a first pipe thickness of the cooling pipe having a cross-sectional shape in a first direction is greater than a second pipe thickness in a second direction perpendicular to the first direction, and in the installing of the pipe, the cooling pipe is disposed so that the first direction is in parallel to the flow direction, and the cavity includes a trench groove-shaped pipe arrangement channel in which the cooling pipe is disposed, and a plurality of protrusion cooling pin molded grooves connected to the pipe arrangement channel, and the molten metal is filled in the plurality of protrusion cooling pin molded grooves to form cooling pins.

Effects of the Invention

According to the present invention, all of the objectives of the present invention described above can be achieved. Specifically, when casting products for cooling are manufactured through an insert injection molding method using a cooling pipe, the cooling pipe is formed in such a way that a first pipe thickness of the cooling pipe having a cross-sectional shape in a first radius direction is greater than a second pipe thickness in a second radius direction perpendicular to the first radius direction and the cooling pipe is disposed so that the first radius direction in a cavity of a mold is in parallel to the flow direction of a molten metal and thus the cooling pipe can be prevented from being deformed by the flow pressure of the molten metal.

In addition, cooling pins connected to the cooling pipe is formed so that cooling efficiency can be enhanced and the cooling pipe can be prevented from being deviated in an insert injection molding process.

DETAILED DESCRIPTION FOR CARRYING OUT THE INVENTION

Hereinafter, the configuration and operation of the present invention will be described in detail with reference to the accompanying drawings.

Figure 1:
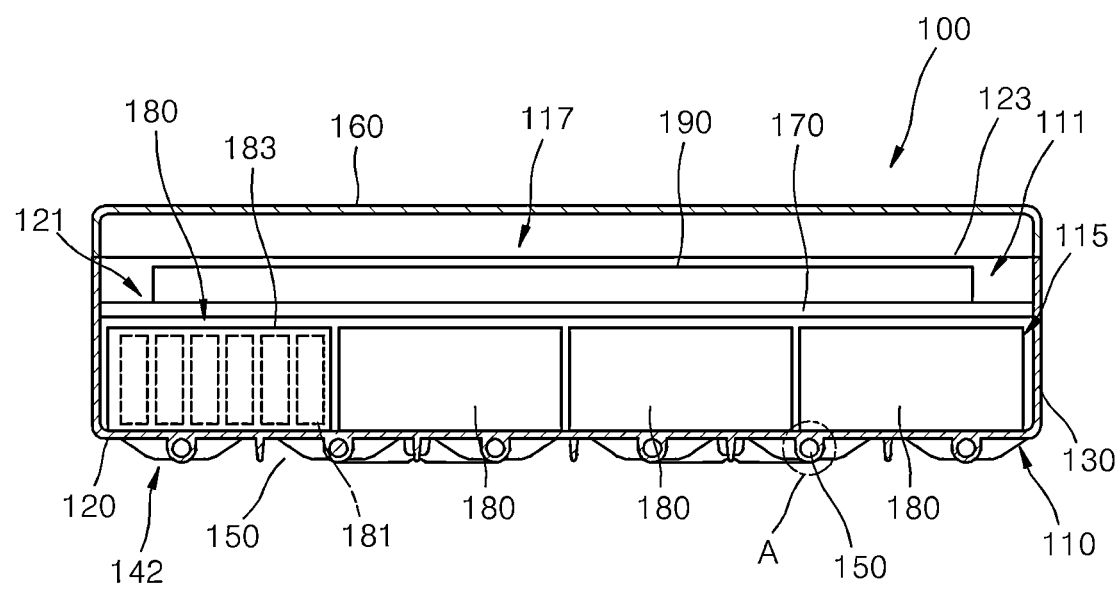
FIG. 1 is a diagram illustrating a schematic configuration of a battery pack for an electric vehicle in which casting products for cooling heating elements are used, according to an embodiment of the present invention.

FIG. 1 illustrates a schematic configuration of a battery pack for an electric vehicle in which casting products for cooling heating elements according to an embodiment of the present invention are used. Referring to FIG. 1, a battery pack 100 for an electric vehicle includes a pack housing 110, a split plate 170 installed in the pack housing 110, a plurality of battery modules 180 installed in the pack housing 110, and a control module 190 installed in the pack housing 110.

The pack housing 110 provides an installation space 111 in which the split plate 170, the plurality of battery modules 180 and the control module 190 are installed, therein. The pack housing 110 is entirely made of an aluminum alloy material and is manufactured by casting. The pack housing 110 includes a housing main body 120 and a housing cover 160 coupled to the housing main body 120.

Figure 2:
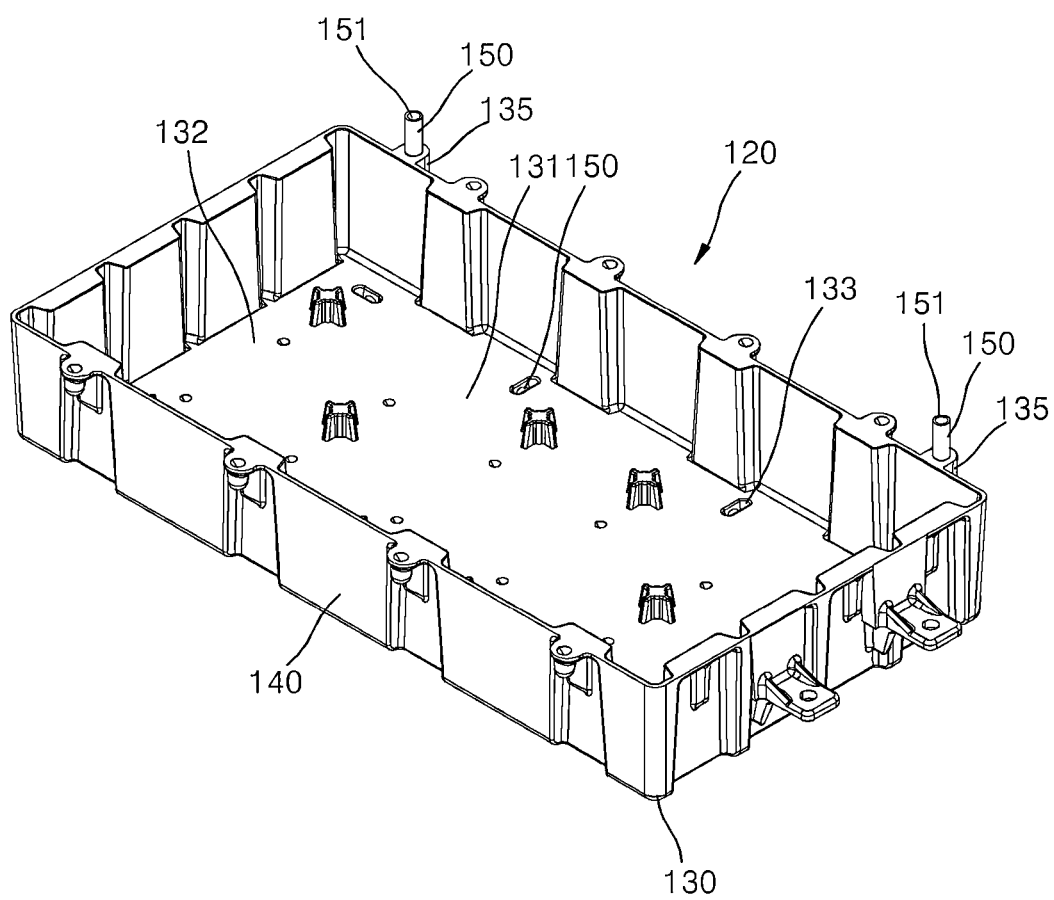
FIGS. 2 and 3 are perspective views illustrating a shape in which a housing main body of the battery pack for an electric vehicle shown in FIG. 1 is seen in different directions.
Figure 3:
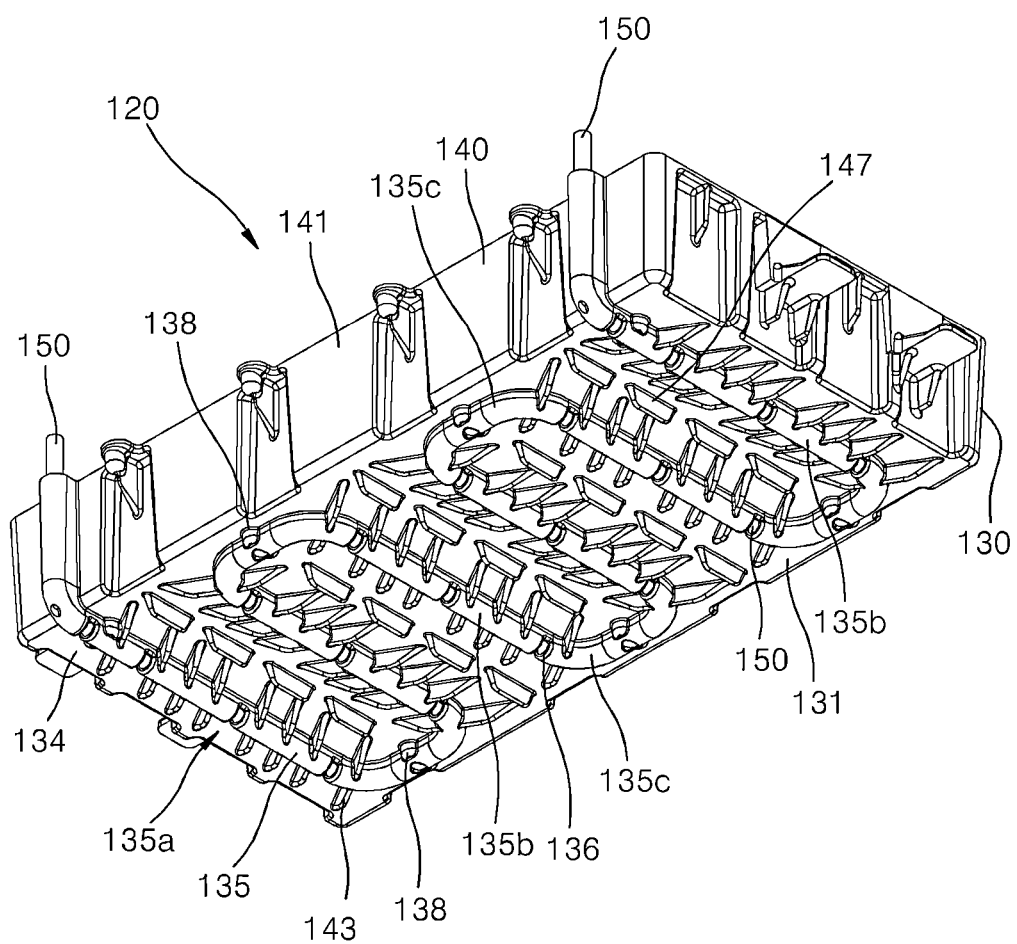
Figure 4:
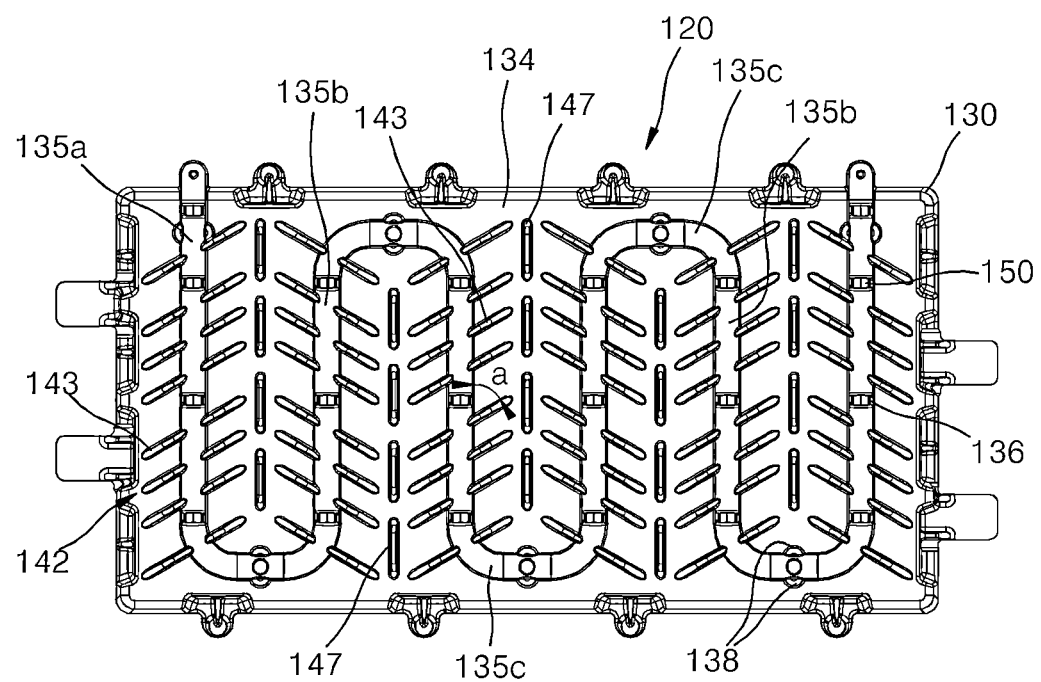
FIG. 4 is a bottom view of the housing main body shown in FIGS. 2 and 3.
Figure 5:
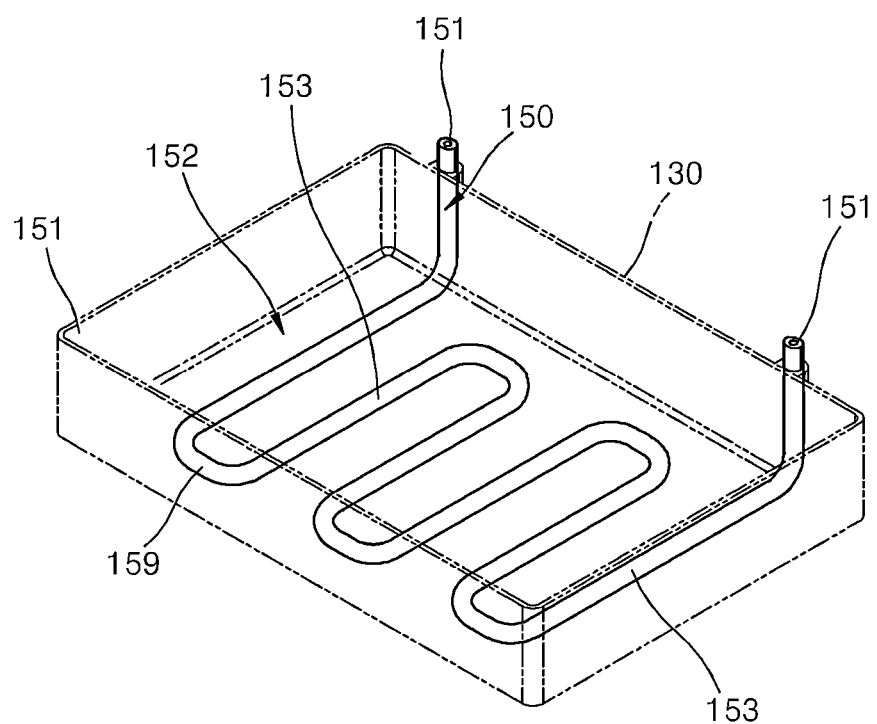
FIG. 5 is a perspective view illustrating a cooling pipe provided in the housing main body shown in FIGS. 2 and 3.

The housing main body 120 provides an inner space 121, and an upper end of the housing main body 120 is open so that an opening 123 can be formed. Referring to FIGS. 1 through 3, the housing main body 120 includes a housing body 130 and a cooling pipe 150 integrally coupled to the housing body 130. The housing main body 120 is manufactured using an insert injection molding method and is an embodiment of casting products for cooling heating elements according to the present invention.

The housing body 130 that is made of an aluminum alloy material includes a bottom 131 having a generally flat plate shape, sidewalls 140 that extend from edges of the bottom 131 in the form of a wall, protrusion extensions 135 that long extend in a protruding shape from the bottom 131 and the sidewalls 140, and a cooling pin structure 142 that protrudes from the bottom 131. The cooling pipe 150 is buried in the protrusion extensions 135 of the housing body 130 so that the housing body 130 and the cooling pipe 150 are integrally coupled to each other.

The bottom 131 that is a generally flat plate-shaped plate portion has a plurality of exposure grooves 133 formed in an inner surface 132 contacting the inner space 121. Part of the cooling pipe 150 is exposed through the plurality of exposure grooves 133. The plurality of exposure grooves 133 are formed by a structure for fixing the cooling pipe 150 when the housing main body 120 is manufactured using an insert injection molding method. Since part of the cooling pipe 150 is exposed by the plurality of exposure grooves 133, cooling performance can be enhanced. Part of the protrusion extensions 135 and the cooling pin structure 142 are formed on an outer surface 134 that is an opposite surface to the inner surface 132 of the bottom 131.

The sidewalls 140 extend from the edges of the bottom 131 in the form of a wall. Part of the protrusion extensions 135 is formed on the outer surface 141 of the sidewalls 140 to extend from the bottom 131 in a height direction and correspond to both ends of the cooling pipe 150.

The protrusion extensions 135 long extend in a protruding shape from the outer surface 134 of the bottom 131 and the outer surface 141 of the sidewalls 140 in an extension direction of the cooling pipe 150. A plurality of pipe exposure portions 136 are spaced apart from each other in the extension direction of the protrusion extensions 135. The plurality of pipe exposure portions 136 are formed by a structure for fixing the cooling pipe 150 when the housing main body 120 is manufactured through an insert injection molding method. Since part of the cooling pipe 150 is exposed by the plurality of pipe exposure portions 136, cooling performance can be enhanced.

The protrusion extensions 135 include zigzag protrusion extensions 135a that protrude from the outer surface 134 of the bottom 131 and extend in a zigzag form. The zigzag protrusion extensions 135a include a plurality of protrusions main extensions 135b arranged in parallel to each other, and a plurality of protrusion bent portions 135c that are bent and extend to connect two adjacent protrusion main extensions 135b.

The cooling pin structure 142 protrudes from the outer surface 134 of the bottom 131 provided in the housing body 130. The cooling pin structure 142 includes a plurality of protrusion cooling pins 143 that extend in a shape crossing the protrusion main extensions 135b of the zigzag protrusion extensions 135a, and a plurality of bottom cooling pins 147 that are spaced apart from the protrusion main extensions 135b. Cooling efficiency can be enhanced by the cooling pin structure 142, and out of position of the cooling pipe 150 during insert injection molding can be prevented.

The plurality of protrusion cooling pins 143 are sequentially formed on the protrusion main extensions 135b of the zigzag protrusion extensions 135a. Each of the plurality of protrusion cooling pins 143 extends in a shape crossing the protrusion main extensions 135b of the zigzag protrusion extensions 135a. The extension direction of the protrusion cooling pins 143 is inclined at an angle a that is not perpendicular to the extension direction of the protrusion main extensions 135b. The plurality of protrusion cooling pins 143 arranged in one protrusion main extension 135b may be arranged to be inclined at the same angle so that the length of the cooling pin 143 can be increased. The protrusion cooling pins 143 arranged in each of two adjacent protrusion main extensions 135b are inclined in opposite directions.

The plurality of bottom cooling pins 147 are spaced apart from the protrusion cooling pins 143 between two adjacent protrusion main extensions 135b. Each of the bottom cooling pins 147 extends generally in parallel to the protrusion main extensions 135b.

The cooling pipe 150 that is made of an aluminum alloy material is integrally coupled to the housing body 130. Referring to FIGS. 1 through 5, the cooling pipe 150 provides a path 151 through which a cooling fluid flows, and includes a zigzag pipe extension 152 extending in a zigzag shape. The zigzag pipe extension 152 is buried in the zigzag protrusion extensions 135a formed on the bottom 131 of the housing body 130 and is formed integrally with the housing body 130. The zigzag pipe extension 152 includes a plurality of pipe main extensions 153 arranged in parallel to each other, and a plurality of pipe bent portions 159 that are bent and extend to connect two adjacent main extensions 153. The plurality of pipe main extensions 153 are buried to correspond to the protrusion main extensions 135b of the zigzag protrusion extensions 135a, and the plurality of pipe bent portions 159 are buried to correspond to the protrusion bent portions 135c of the zigzag protrusion extensions 135a.

Figure 6:
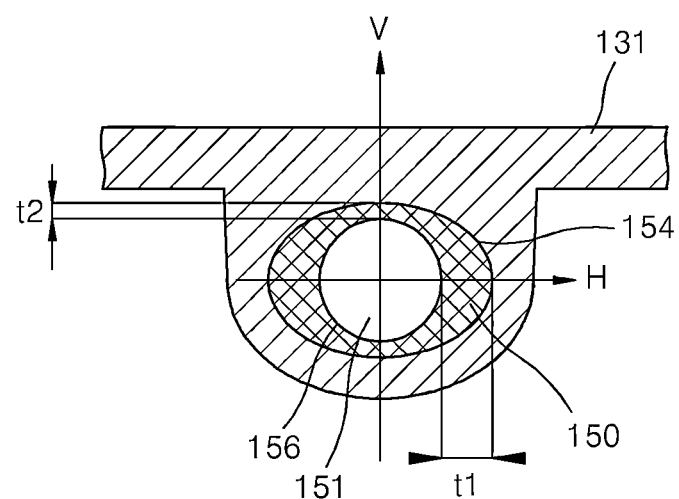
FIG. 6 is an enlarged view of a portion A of FIG. 1.

Although, in the present embodiment, the zigzag pipe extensions 153 are placed on the bottom 131 of the housing body 130, unlike this, the zigzag pipe extensions 153 may be additionally placed at the sidewalls 140 of the housing body 130 or only at the sidewalls 140, and this also belongs to the scope of the present invention. The cooling pipe 150 is fully buried in the protrusion extensions 135 provided at the housing body 130. Referring to FIG. 6, the cooling pipe 150 is formed in such a way that a first pipe thickness t1 that is a thickness of the cooling pipe 150 having a cross-sectional shape in a first radius direction H (first direction) is greater than a second pipe thickness t2 that is a thickness in a second radius direction V (second direction) perpendicular to the first radius direction H. In the present embodiment, the case where an outer circumference 154 of the cooling pipe 150 has an oval shape in the cross-sectional shape and an inner circumference 156 of the cooling pipe 150 has a circular shape in the cross-sectional shape that is arranged concentrically with the outer circumference 154, will be described. The second radius direction V is also a direction in which the housing body 130 faces the battery module 180 that is a heating element. A shape between the outer circumference 154 and the inner circumference 156 in the cross-section of the cooling pipe 150 is symmetric with the center. The cooling pipe 150 is disposed in such a way that the first radius direction H is in parallel to the extension direction of the bottom 131 in a portion of the cooling pipe 150 buried in the bottom 131. Through the shape and arrangement of the cooling pipe 150, the deformation of the cooling pipe 150 is prevented during a process of manufacturing the housing main body 120 using insert injection molding. Although, in the present embodiment, the case where, as shown in FIG. 6, the cooling pipe 150 has a shape with the oval outer circumference 154 and the circular inner circumference 156 will be described, the present invention is not limited thereto, and any shape in which the cooling pipe 150 is formed in such a way that a first pipe thickness t1 that is a thickness of the cooling pipe 150 having a cross-sectional shape in a first radius direction H (first direction) is greater than a second pipe thickness t2 that is a thickness in a second radius direction V (second direction) perpendicular to the first radius direction H, is possible. For example, as shown in FIG. 7, other various shapes are possible.

Figure 7:
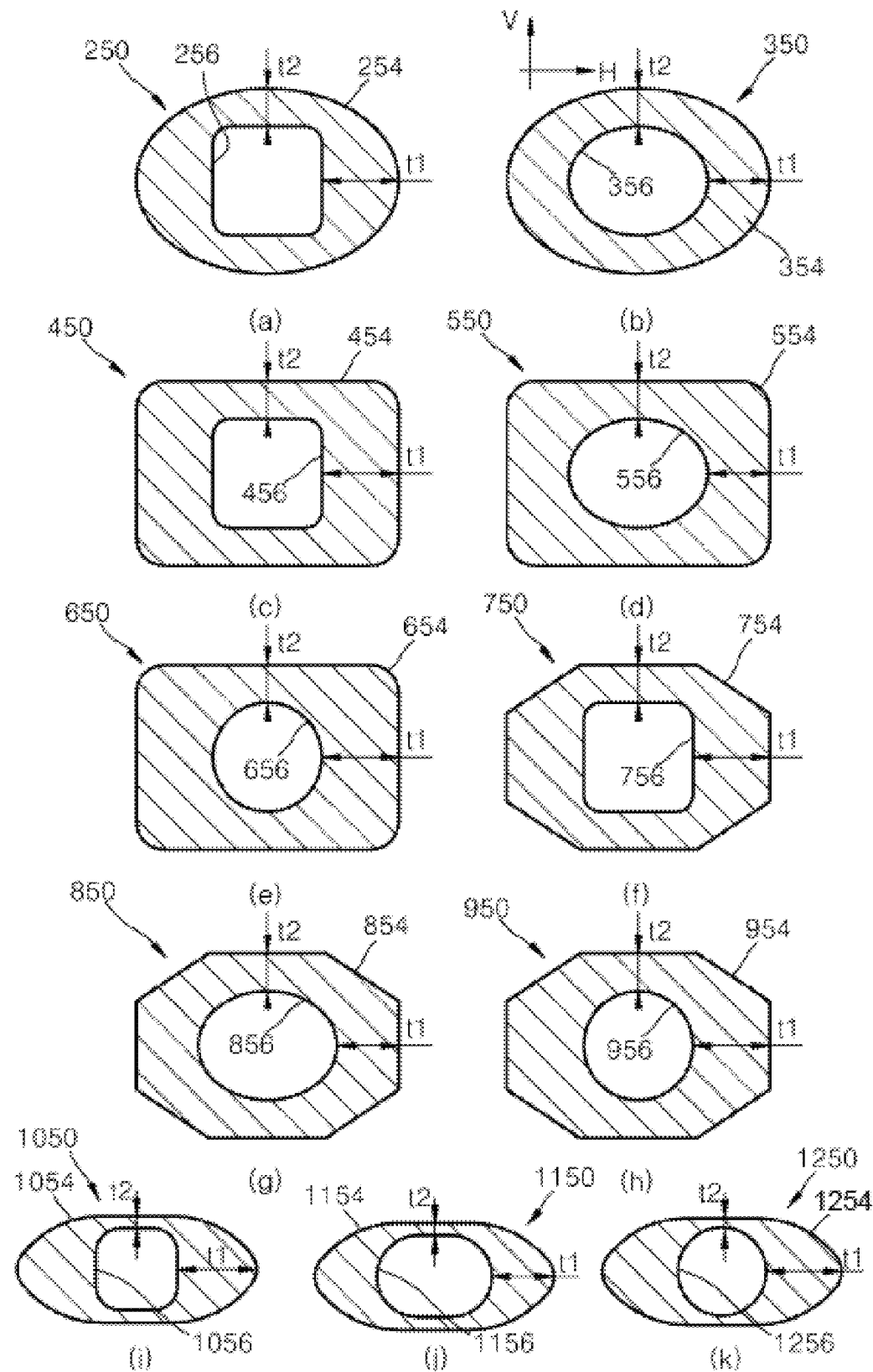
FIG. 7 is a cross-sectional view illustrating a cross-sectional shape of cooling pipes according to another embodiment of the present invention.

FIG. 7 illustrates cross-sectional shapes of various cooling pipes, as shown in (a) to (k). Referring to (a) of FIG. 7, a cooling pipe 250 has an oval-shaped outer circumference 254 and a square-shaped inner circumference 256 arranged concentrically with the outer circumference 254 so that a first pipe thickness t1 that is a thickness in a first radius direction H (first direction) is greater than a second pipe thickness t2 that is a thickness in a second radius direction V.

Referring to (b) of FIG. 7, a cooling pipe 350 has an oval-shaped outer circumference 354 and an oval-shaped inner circumference 356 arranged concentrically with the outer circumference 354 so that a first pipe thickness t1 that is a thickness in a first radius direction H (first direction) is greater than a second pipe thickness t2 that is a thickness in a second radius direction V.

Referring to (c) of FIG. 7, a cooling pipe 450 has a rectangular outer circumference 454 and a square-shaped inner circumference 456 arranged concentrically with the outer circumference 454 so that a first pipe thickness t1 that is a thickness in a first radius direction H (first direction) is greater than a second pipe thickness t2 that is a thickness in a second radius direction V.

Referring to (d) of FIG. 7, a cooling pipe 550 has a rectangular outer circumference 554 and an oval-shaped inner circumference 556 arranged concentrically with the outer circumference 554 so that a first pipe thickness t1 that is a thickness in a first radius direction H (first direction) is greater than a second pipe thickness t2 that is a thickness in a second radius direction V.

Referring to (e) of FIG. 7, a cooling pipe 650 has a rectangular outer circumference 654 and a circular inner circumference 656 arranged concentrically with the outer circumference 654 so that a first pipe thickness t1 that is a thickness in a first radius direction H (first direction) is greater than a second pipe thickness t2 that is a thickness in a second radius direction V.

Referring to (f) of FIG. 7, a cooling pipe 750 has an octagon-shaped outer circumference 754 and a square-shaped inner circumference 756 arranged concentrically with the outer circumference 754 so that a first pipe thickness t1 that is a thickness in a first radius direction H (first direction) is greater than a second pipe thickness t2 that is a thickness in a second radius direction V.

Referring to (g) of FIG. 7, a cooling pipe 850 has an octagon-shaped outer circumference 854 and an oval-shaped inner circumference 856 arranged concentrically with the outer circumference 854 so that a first pipe thickness t1 that is a thickness in a first radius direction H (first direction) is greater than a second pipe thickness t2 that is a thickness in a second radius direction V.

Referring to (h) of FIG. 7, a cooling pipe 950 has an octagon-shaped outer circumference 954 and a circular inner circumference 956 arranged concentrically with the outer circumference 954 so that a first pipe thickness t1 that is a thickness in a first radius direction H (first direction) is greater than a second pipe thickness t2 that is a thickness in a second radius direction V.

Referring to (i) of FIG. 7, a cooling pipe 1050 has a generally hexagon-shaped outer circumference 1054 and a square-shaped inner circumference 1056 arranged concentrically with the outer circumference 1054 so that a first pipe thickness t1 that is a thickness in a first radius direction H (first direction) is greater than a second pipe thickness t2 that is a thickness in a second radius direction V.

Referring to (j) of FIG. 7, a cooling pipe 1150 has a generally hexagon-shaped outer circumference 1154 and a generally oval-shaped inner circumference 1156 arranged concentrically with the outer circumference 1154 so that a first pipe thickness t1 that is a thickness in a first radius direction H (first direction) is greater than a second pipe thickness t2 that is a thickness in a second radius direction V.

Referring to (k) of FIG. 7, a cooling pipe 1250 has a generally hexagon-shaped outer circumference 1254 and a generally circular inner circumference 1256 arranged concentrically with the outer circumference 1254 so that a first pipe thickness t1 that is a thickness in a first radius direction H (first direction) is greater than a second pipe thickness t2 that is a thickness in a second radius direction V.

Referring to FIG. 1, the housing cover 160 is detachably coupled to an upper end of the housing main body 120 to close the opening 123 formed in the housing main body 120. In the present embodiment, the case where the housing cover 160 is made of an aluminum alloy material, will be described. Although not shown, the structure of the cooling pipe 150 provided at the housing body 120 may be installed at the housing cover 160, and this also belongs to the scope of the present invention.

The split plate 170 is installed in the inner space 121 of the housing main body 120 and splits the installation space 111 of the pack housing 110 into a lower installation space 115 and an upper installation space 117. A plurality of battery modules 180 are placed in the lower installation space 115, and a control module 190 is placed in the upper installation space 117. In the present embodiment, the case where the control module 190 is coupled to the split plate 170, will be described. In the present embodiment, the case where the split plate 170 is made of an aluminum alloy material, will be described. Although not shown, the structure of the cooling pipe 150 provided at the housing main body 120 may be installed at the housing cover 160, and this also belongs to the scope of the present invention. Thus, the split plate 170 may function as a cooling plate for cooling the control module 190 that is a heating element.

A plurality of battery modules 180 are arranged in the lower installation space 115 inside the pack housing 110. The plurality of battery modules 180 include a plurality of battery cells 181, and a module case 183 in which the plurality of battery cells 181 are accommodated and protected. In the present embodiment, the case where the module case 183 is made of an aluminum alloy material, will be described. Although not shown, the structure of the cooling pipe 150 provided at the housing main body 120 may be installed on at least part of the module case 183, and this also belongs to the scope of the present invention. Thus, the module case 183 may function as a cooling unit for cooling the battery module 180 that is a heating element.

The control module 190 is placed in the upper installation space 115 inside the pack housing 110. The control module 190 that is a heating element having a battery management system (BMS) may be installed at the split plate 170 that functions as a cooling plate and cooled.

Figure 8:
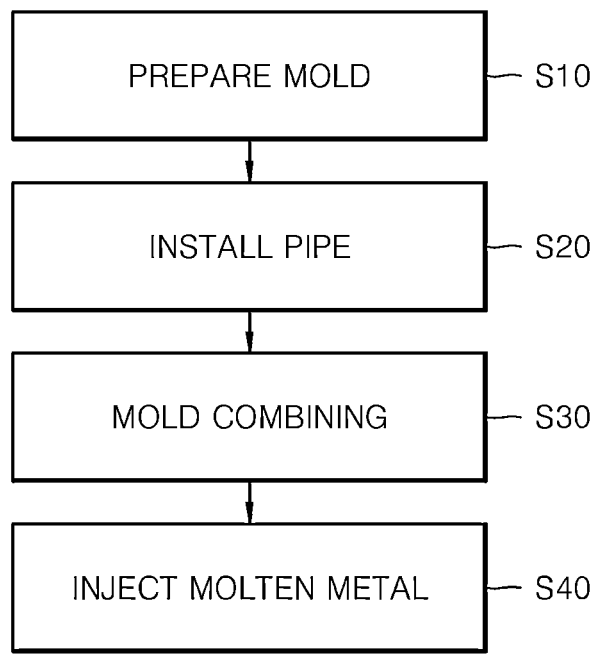
FIG. 8 is a flowchart schematically illustrating a method of manufacturing casting products for cooling heating elements according to an embodiment of the present invention.

FIG. 8 is a flowchart schematically illustrating a method of manufacturing casting products for cooling heating elements according to an embodiment of the present invention. Referring to FIG. 8, the method of manufacturing casting products for cooling heating elements according to an embodiment of the present invention includes a mold preparing operation (S10) of preparing a mold, a pipe installing operation (S20) in which a cooling pipe is installed at the mold prepared in the mold preparing operation (S10), a mold combining operation (S30) in which mold combining is performed in a state in which the cooling pipe is installed at the mold through the pipe installing operation (S20), thereby forming a cavity in the mold, and a molten metal injecting operation (S40) in which a molten metal is injected into the cavity formed by performing the mold combining operation (S30).

Figure 9:
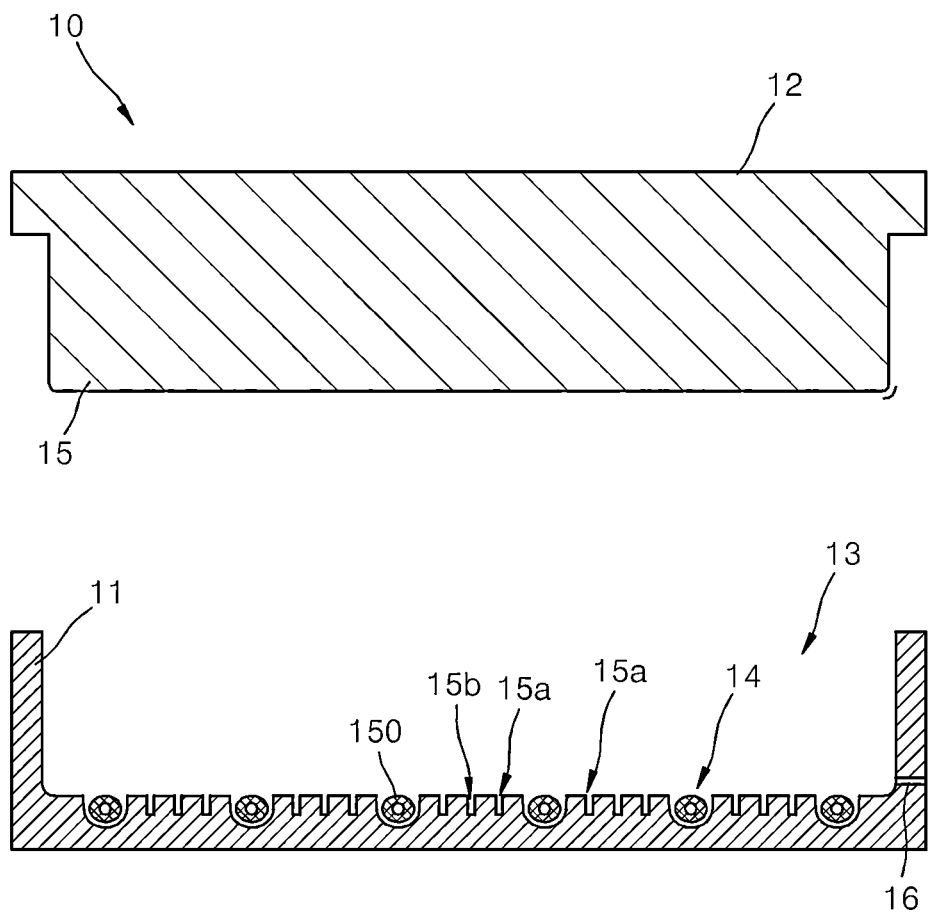
FIG. 9 is a view for describing a mold preparing operation and a pipe installing operation of FIG. 8.

In the mold preparing operation (S10), a mold for manufacturing casting products for cooling heating elements made of an aluminum alloy material by using an insert injection molding method is prepared in a released state. Referring to FIG. 9, a mold 10 includes a first mold 11 placed under the mold 10, and a second mold 12 placed on the mold 10. A molded groove 13 is formed in the first mold 11 to face the second mold 12. A pipe arrangement channel 14 having a trench groove shape in which a cooling pipe 150 is disposed, and a plurality of pin molded grooves 15a and 15b are formed on the bottom of the molded groove 13. The pipe arrangement channel 14 corresponds to a zigzag pipe extension 152 of the cooling pipe 150. The plurality of pin molded grooves 15a and 15b include a protrusion cooling pin molded groove 15a formed to correspond to a protrusion cooling pin 143, and a bottom cooling pin molded groove 15b formed to correspond to a bottom cooling pin 147. A molten metal inlet 16 is formed in the first mold 11. The second mold 12 includes a molded protrusion 15 which faces the first mold 11 and can be inserted into the molded groove 13. Although not shown, the mold 10 further includes zig structures for putting the cooling pipe 150 in place at the pipe arrangement channel 14 and fixing the cooling pipe 150. Each of the zig structures may put the cooling pipe 150 that is bent in a zigzag shape and extends, in place, as shown in FIG. 3, and may fix the cooling pipe 150. Each of the zig structures supports the cooling pipe 150 at both sides thereof to prevent movement of the cooling pipe 150. Thus, as shown in FIG. 3, protrusions 138 that protrude toward both sides of the protrusion 135 therebetween by using a fixing structure, are formed on the outer surface 134 of the bottom 131 of the housing body 130. Fixing structures are consecutively arranged in an extension direction of the cooling pipe 150, and in particular, are positioned to include points corresponding to the bent portion 159 of the cooling pipe 150.

Figure 10:
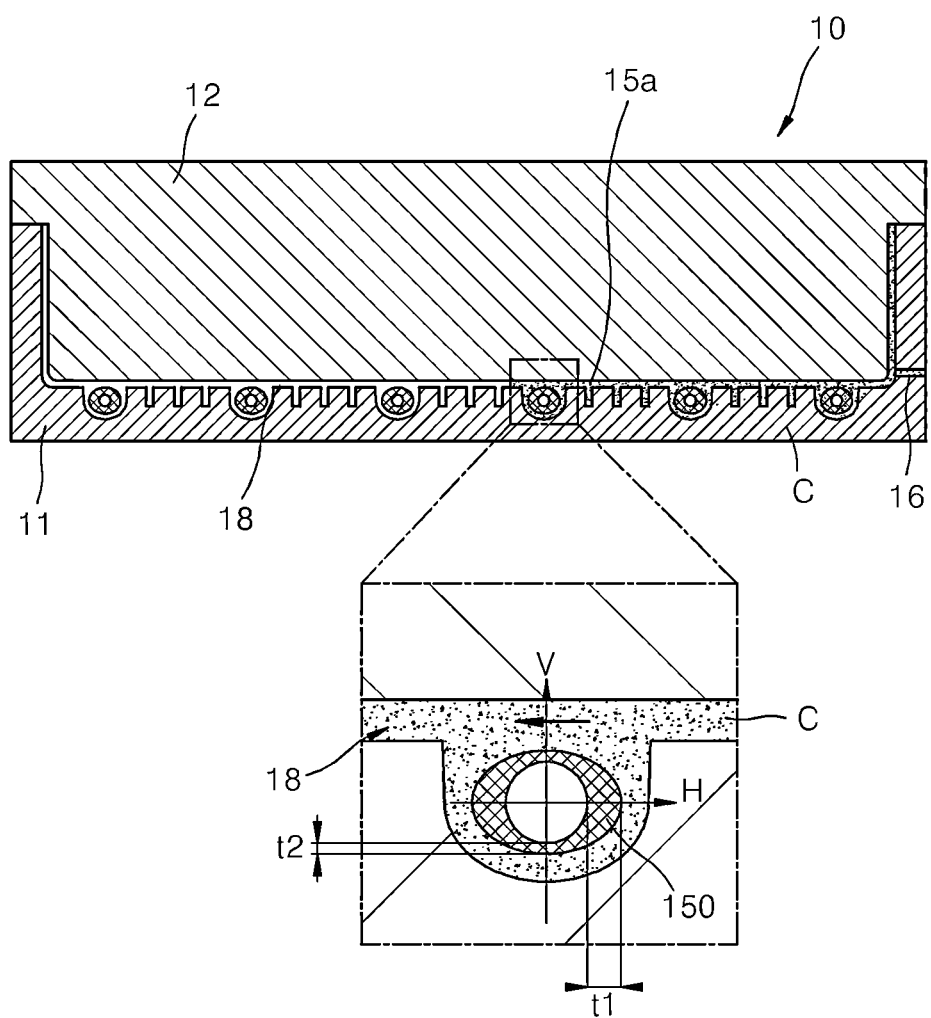
FIG. 10 is a view for describing a state in which a molten metal injecting operation of FIG. 8 is performed.

In the pipe installing operation (S20), in a state in which the mold 10 in a released state is prepared through the mold preparing operation (S10), the cooling pipe 150 is installed to be put in place at the pipe arrangement channel 14 formed in the first mold 11, as shown in FIG. 9. Although not shown, in the pipe installing operation (S20), the cooling pipe 150 is fixed by the fixing structure and is maintained in place in a state in which the cooling pipe 150 is spaced apart from the surface of the pipe arrangement channel 14. In the pipe installing operation (S20), the cooling pipe 150 is installed in such a way that the first radius direction H having a first pipe thickness t1 that is greater than a second pipe thickness t2 is generally in parallel to the flow direction of a molten metal C, as shown in FIG. 10. After the cooling pipe 150 is put in place inside the mold 10 through the pipe installing operation (S20), the mold combining operation (S30) is performed.

In the mold combining operation (S30), in a state in which the cooling pipe 150 is installed at the mold 10 through the pipe installing operation (S20), the first mold 11 and the second mold 12 of the mold 10 are combined with each other so that a cavity 18 is formed in the mold 10, as shown in FIG. 10. After the cavity 18 is formed in the mold 10 through the mold combining operation (S30), a molten metal injecting operation (S40) is performed.

In the molten metal injecting operation (S40), as shown in FIG. 10, an aluminum metal material molten metal C is injected into the cavity 18 installed when the cooling pipe 150 is inserted into the cavity 18, through the molten metal inlet 16. The molten metal C in a high temperature high pressure state flows in the cavity 18 in a flow direction indicated by an arrow. The cooling pipe 150 is arranged in such a way that the first radius direction H having a first pipe thickness t1 that is greater than a second pipe thickness t2 is generally in parallel to the flow direction of the molten metal C and thus, the cooling pipe 150 is prevented from being deformed by the molten metal C. In addition, the molten metal C is filled in the protrusion cooling pin molded groove 15a so that out of position of the cooling pipe 150 is prevented.

Figure 11:
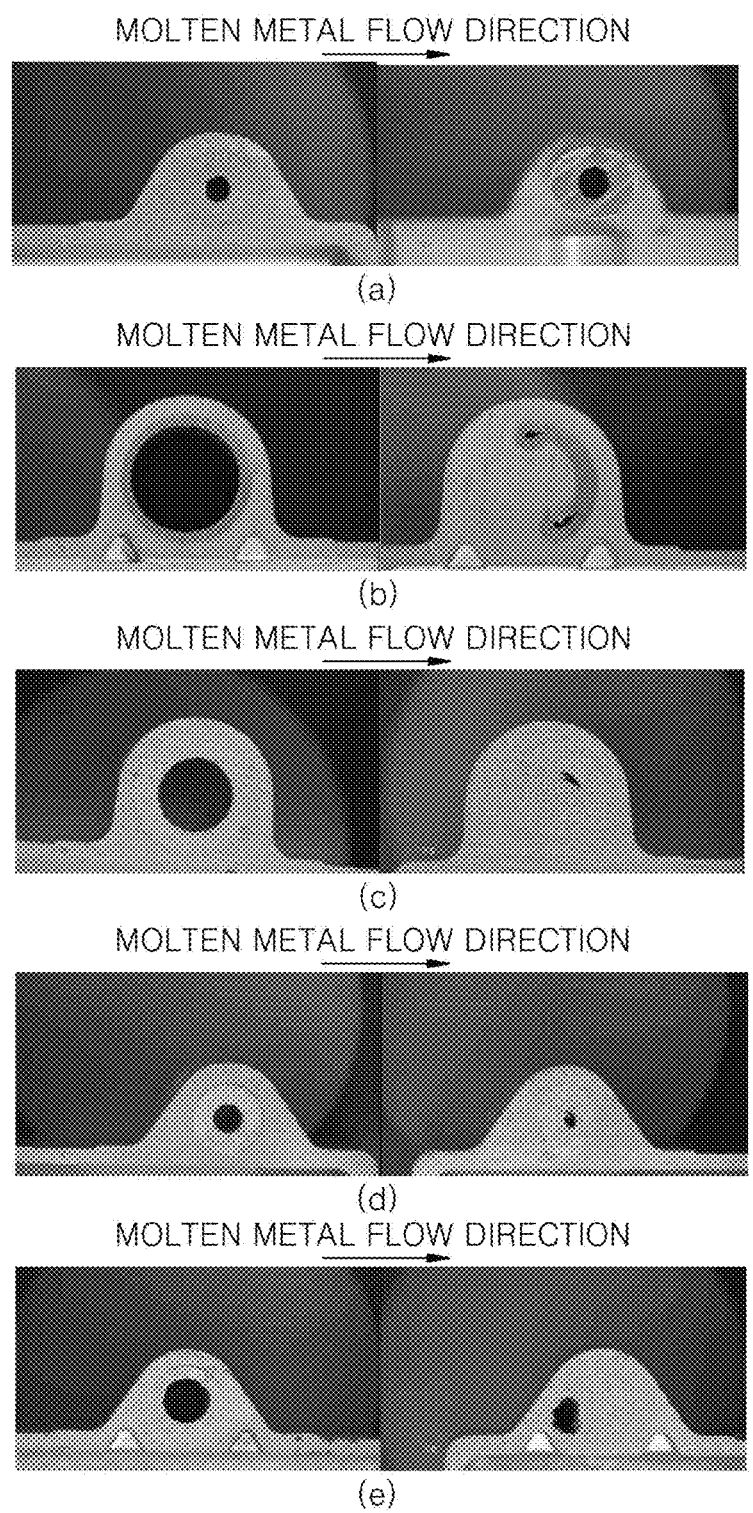
FIG. 11 is a view for comparing casting products for cooling heating elements manufactured using a cooling pipe according to the present invention with casting products for cooling heating elements manufactured using another cooling pipe.

(a) through (e) of FIG. 11 are diagrams for comparing casting products for cooling heating elements manufactured using a cooling pipe according to the present invention with casting products for cooling heating elements manufactured using another cooling pipe. In each of (a) through (e) of FIG.

11, the left diagram relates to a portion in which low pressure is applied to the cooling pipe during a molten metal injecting process, and the right diagram relates to a portion in which high pressure is applied to the cooling pipe.

(a) of FIG. 11 is a diagram of casting products (pack housing of a battery pack for an electric vehicle) for cooling heating elements manufactured using a cooling pipe according to the present invention and is the case where an oval-shaped cooling pipe having a large outer diameter in a first direction of 9 mm and a thickness of 2.5 mm is used. It is ascertained from (a) of FIG. 11 that the cooling pipe is not deformed even in a portion to which high pressure is applied but shape is maintained as it is.

(b) through (e) of FIG. 11 is diagram of casting products (pack housing of a battery pack for an electric vehicle) for cooling heating elements manufactured using a cooling pipe having a different configuration from the present invention. (b) of FIG. 11 is the case where a circular pipe made of a generally copper material is used, (c) of FIG. 11 is the case where a circular pipe being made of an aluminum alloy material and having an outer diameter of 15 mm and a thickness of 3 mm is used, (d) of FIG. 11 is the case where a circular pipe being made of an aluminum alloy material and having an outer diameter of 9 mm and a thickness of 3 mm is used, and (e) of FIG. 11 is the case where a circular pipe being made of an aluminum alloy material and having an outer diameter of 9 mm and a thickness of 2 mm is used. It is ascertained from (b) through (e) of FIG. 11 that the circular shape of the cooling pipe may be maintained in a low-pressure portion but, in a portion to which high pressure is applied, the cooling pipe is deformed by pressure at the upstream of the flow direction of the molten metal and a cooling flow path is closed.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. Casting products for cooling heating elements, the casting products comprising:
   a body made of a metal material; and
   a cooling pipe providing a path through which a cooling fluid flows, and being made of an aluminum alloy material,
   wherein the body comprises:
     a plate-shaped plate portion;
     protrusion extensions protruding from one surface of the plate-shaped plate portion and extending along the cooling pipe; and
     a cooling pin structure formed integrally with the plate-shaped plate portion,
   wherein a portion of the cooling pipe is completely buried in each of the protrusion extension so that a buried portion of the cooling pipe is not exposed to an outside of each protrusion extension,
   wherein the cooling pipe is formed in such a way that a first pipe thickness of the cooling pipe having a cross-sectional shape in a first direction is greater than a second pipe thickness in a second direction perpendicular to the first direction,
   wherein the first direction is in parallel to the plate-shaped plate portion, and the second direction is a thickness direction of the plate-shaped plate portion.

2. The casting products of claim 1, wherein the cooling pin structure comprises a plurality of protrusion cooling pins connected to the protrusion extensions.

3. The casting products of claim 2, wherein the plurality of protrusion cooling pins are sequentially spaced apart from each other in an extension direction of the protrusion extensions, and each of the plurality of protrusion cooling pins extends to cross the protrusion extensions.

4. The casting products of claim 3, wherein an extension direction of each of the protrusion cooling pins is inclined at an angle that is not perpendicular to the extension direction of the protrusion extensions.

5. The casting products of claim 4, wherein the protrusion extensions comprise zigzag protrusion extensions extending in a zigzag shape, and the zigzag protrusion extensions comprise a plurality of protrusion main extensions arranged in parallel to each other, and the plurality of protrusion cooling pins are placed in each of the plurality of protrusion main extensions.

6. The casting products of claim 5, wherein the plurality of protrusion cooling pins placed on one of the plurality of protrusion main extensions are arranged in parallel to each other.

7. The casting products of claim 1, wherein a cross-section of the cooling pipe has a shape symmetric with a center.

8. The casting products of claim 1, wherein the body is formed of an aluminum alloy material.

* * * * *